No. 662,392. Patented Nov. 27, 1900.
F. W. BÜHNE.
METHOD OF MAKING METAL WOOL.
(Application filed Dec. 12, 1899.)
(No Model.) 2 Sheets—Sheet 1.
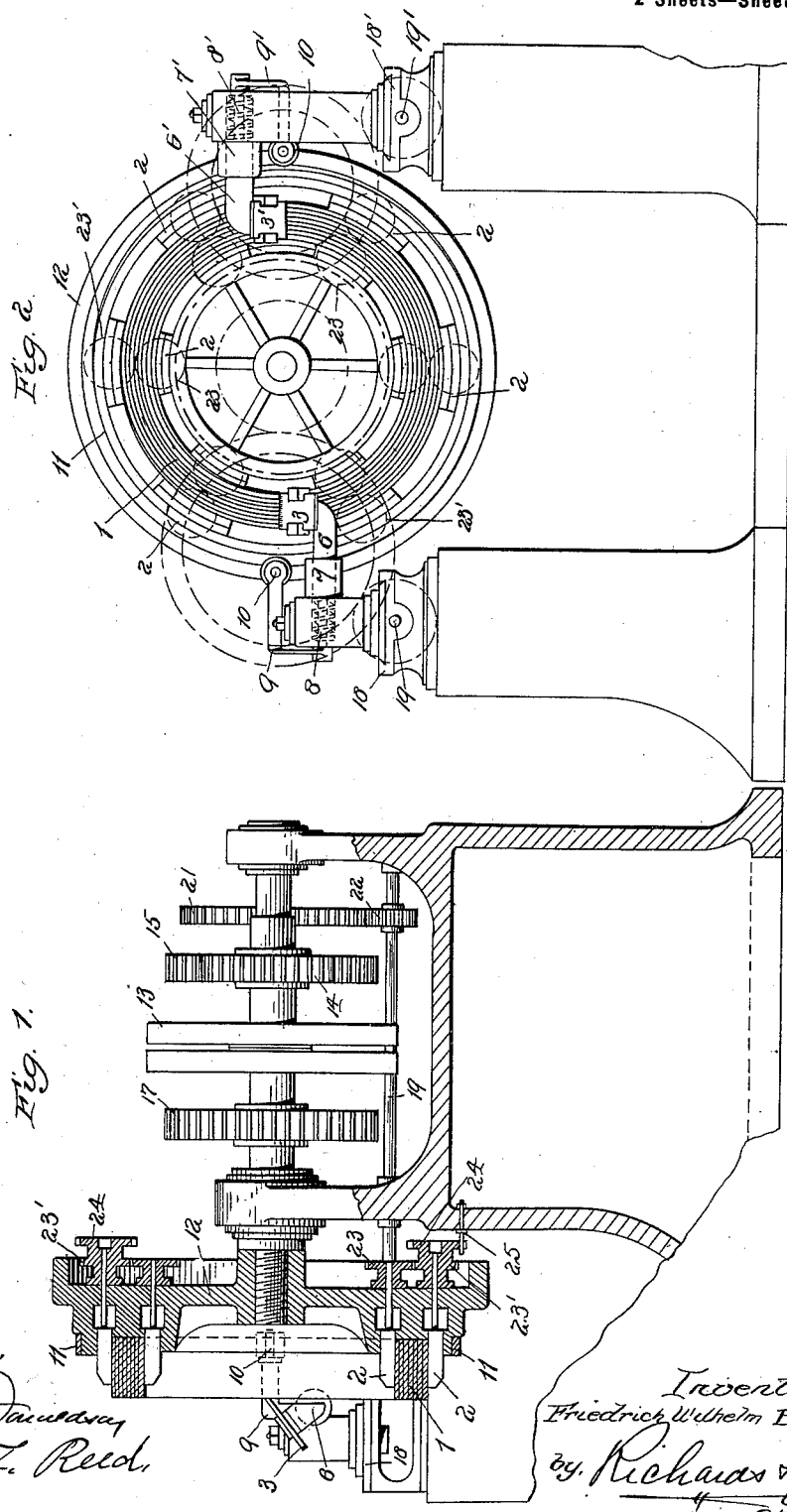
Witnesses:
Inventor,
Friedrich Wilhelm Bühne
by Richards & Co
Attys.
THE NORRIS PETERS CO., PHOTO-LITHO., WASHINGTON, D. C.

No. 662,392. Patented Nov. 27, 1900.
F. W. BÜHNE.
METHOD OF MAKING METAL WOOL.
(Application filed Dec. 12, 1899.)
(No Model.) 2 Sheets—Sheet 2.
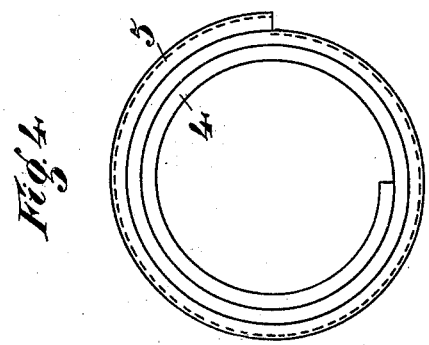
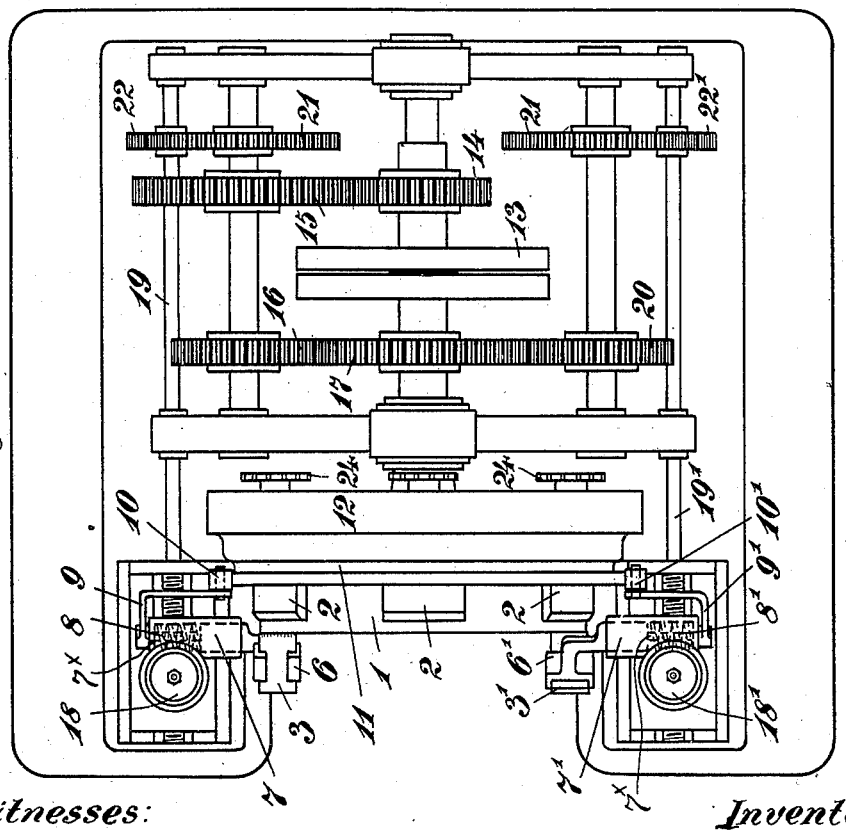
Witnesses:
Inventor:
Friedrich Wilhelm Bühne
ATTORNEYS

UNITED STATES PATENT OFFICE.

FRIEDRICH WILHELM BÜHNE, OF FREIBURG, GERMANY.

METHOD OF MAKING METAL WOOL.

SPECIFICATION forming part of Letters Patent No. 662,392, dated November 27, 1900.

Application filed December 12, 1899. Serial No. 740,104. (No specimens.)

*To all whom it may concern:*

Be it known that I, FRIEDRICH WILHELM BÜHNE, a subject of the Grand Duke of Baden, and a resident of Freiburg, in the Grand Duchy of Baden, German Empire, have invented a new and useful method of manufacturing metal chips, such as used for cleaning floors, grinding and polishing objects of various kinds, and the like, of which the following is a specification.

The chips have been produced heretofore by cutting them from thin metal wires or turning them off from metal disks having only the same thickness as the chips to be made. These two methods are not economical and there result from them chips of but little elasticity. Besides, the chips produced according to these methods have not a sufficient sharpness on account of the smoothness of the surfaces of the rolled metal.

The object of my invention is to do away with these disadvantages and to produce chips of great sharpness and elasticity in a very economical manner.

The main feature of my improved method resides in cutting the metal from which the chips shall be produced parallel to its grains, the metal being used in the shape of rings or bands which are rotated around a shaft and have such a breadth that not only one but several chips are cut at a time, one close to the other.

For manufacturing chips according to this method, especially for cutting them off from the edge of a wound-up metal band, I prefer to make use of the machine illustrated in the accompanying drawings, in which similar numerals denote similar parts similarly located throughout the several views.

The parts on one side of the machine I have marked 3 7 8, &c., while similar parts on the opposite side of the machine I have designated with prime-marks, as 3' 7' 8', &c.

Figure 1 is a front view, Fig. 2 a side elevation, and Fig. 3 a plan, of the machine. Fig. 4 is a detail view of the band in its wound-up form, from which the metal chips are cut.

Referring to Figs. 1 to 3, 1 is the wound-up band, which is held fast by movable clamps or clutches 2. When the band rotates, chips will be cut off by means of cutters 3 and 3', which are arranged at the side or edge of the band. The term "radial" as applied to the cutters is meant to describe the position of the cutters as shown in Fig. 2, in which the working edges of the cutters 3 extend in the plane of a diameter of the wheel and are therefore radial in relation to the wheel. The cutters are pressed against the band by supports 6 and 6', movable in boxes 7 and 7', and pressed outward by springs 8 and 8'. Levers 9 and 9', which hold rolls 10 and 10', are connected with the stems $7^\times$ of the cutter-supports, and the rolls 10 and 10' are pressed against a cam-ring 11 by means of the springs 8 and 8'. The ring 11 has the shape of the wound-up band 1 and is fixed to a drum 12. When the drum 12, with the band 1, is rotated by means of the driving-wheel 13 and the gears 14 15 16 17 the cam-shaped ring 11, which is fixed to the drum 12, controls or adjusts the position of the cutters 3 3' in relation to the edge of the strip by means of the rolls 10 and 10' and the levers 9 and 9' and supports 6 and 6'. The chips are cut off the band by and with the whole working surface of the cutters 3 and 3'. The boxes 7 and 7' of the movable cutter-supports 6 and 6' are arranged on supports 18 and 18' and may be moved in their longitudinal direction by means of spindles 19 and 19', rotated by the gear-wheels 20 21 21' 22 22'. The movable cutter-supports 6 and 6' and the cutters 3 and 3', fixed to them, are thus pressed continuously against the band or ring 1 until the whole material of the band has been completely cut into chips. The clamps or clutches 2, holding the band or ring 1, move back gradually, according to the thickness of the chip, so that the cutters 3 and 3' have always a free working surface. This movement of the clamps 2, the ends of which latter are screw-threaded, is effected by cog-wheels 23 and 23', the central bores of which are also screw-threaded, and by the wheels 24. These last-mentioned wheels 24 pass, one after the other during the rotation of the drum 12, a pin 25, and they are thus rotated a little and screw the clamps 2 back.

Of course the drum may be arranged horizontally or inclined, instead of vertically, and the moving power may be applied either to the drum or to the cutters.

One of the cutters used is toothed—for instance, that marked 3—and the other smooth, so that the first knife cuts grooves, while the second knife removes the raised parts remaining between the grooves. Both the material cut out from the grooves and the raised part cut off from between the grooves yield the metal chips. When a knife or cutter ribbed in such a manner cuts from a wound band 4, as shown in Fig. 4, not from the circumference, but from the front side, each individual cutting edge of this ribbed steel cutter must describe a spiral line 5, as in Fig. 4, and consequently the support which carries the knives must be displaced in that sense. This takes place by the assistance of the ring 11, before described, which is therefore represented helicoidally in Fig. 2—that is, it is thinner on one side than on the other, as in Fig. 1.

Hitherto metal chips unless pared or planed off from thin wire were made by turning sheet-metal plates of a thickness to correspond with the chip to be made. It is manifest that on account of the equal smoothness of skin on both sides of the plate the chips will be smooth on two sides and cannot, therefore, be of sufficient sharpness. This is a material drawback.

Having now described my invention, what I desire to secure by Letters Patent of the United States is—

1. The method of making metal chips consisting in cutting a plurality of chips from the edge of a metal band in the direction of the grain, the thickness of said band being a multiple of the thickness of the chip, substantially as described.

2. The method of making metal chips consisting in cutting a plurality of chips from the edge of a wound-up metal band in the direction of the grain, the thickness of said band being a multiple of the thickness of the chip, substantially as described.

In witness whereof I have hereunto set my hand in presence of two witnesses.

FRIEDRICH WILHELM BÜHNE.

Witnesses:
LUDWIG DREIER,
BENJ. F. LIEFELD.